April 11, 1967 C. H. OSBORN ET AL 3,313,319
FLEXIBLE HOSE
Filed Aug. 25, 1964

INVENTORS
CARROLL H. OSBORN
RUSSELL E. FULTZ
BY

ATTORNEY

United States Patent Office 3,313,319
Patented Apr. 11, 1967

3,313,319
FLEXIBLE HOSE
Carroll H. Osborn, Waynesville, and Russell E. Fultz, Lake Junaluska, N.C., assignors to Dayco Corporation, Dayton, Ohio, a corporation of Ohio
Filed Aug. 25, 1964, Ser. No. 391,857
1 Claim. (Cl. 138—121)

This invention relates to flexible hose, and particularly such hose fabricated of thin wall plastic material. The hose described in the present invention is formed of a single member by the process known as blow molding and is created as a continuous nonreinforced unit having a convoluted wall.

In order to devise a lightweight, flexible and inexpensive hose many types of construction have been utilized in the past. One of the known methods is known as blow molding and a hose made by blow molding is described in United States Patent No. 2,728,356, issued on Dec. 27, 1955, to Brinsmade et al. In the present invention the inventors have developed a product which is more flexible than other blow molded hose, capable of transmitting air under positive or negative pressures with little restriction even during bending, and yet having a certain amount of strength which could otherwise only be provided by the use of reinforcing members.

It is a principal object of the invention to provide a blow molded hose having a high degree of flexibility.

It is a further object to provide such a hose which offers little restriction to flow even during bending.

It is still another object to provide such a hose having extremely high dimensional stability and resistance to external pressures.

The above objects have been carried out as described in the present application by varying the thickness of the wall which represents a distinct departure from the prior art as explained, for example, in the above-referenced patent to Brinsmade et al. Applicants have found that this flexibility may be achieved by forming the walls at the crests of the convolutions with a lesser thickness than the walls at the troughs, this relationship being roughly one-third to one-half as thick at the crests as at the troughs. At the same time, the extra thickness at the troughs provides a certain reinforcing effect to complement the flexibility created by the thinner sections at the crests, and provides resistance to external pressure while maintaining dimensional stability. This effect is additionally enhanced by limiting the depth of the convolutions to less than 11% of the inner diameter of the hose.

A third factor which has been found to create the desired effect involves the use of a radius at the crests which is only half the radius at the troughs.

The above inventive concepts are more clearly understood from the following description of the invention and by reference to the drawings, in which.

Figure 1:
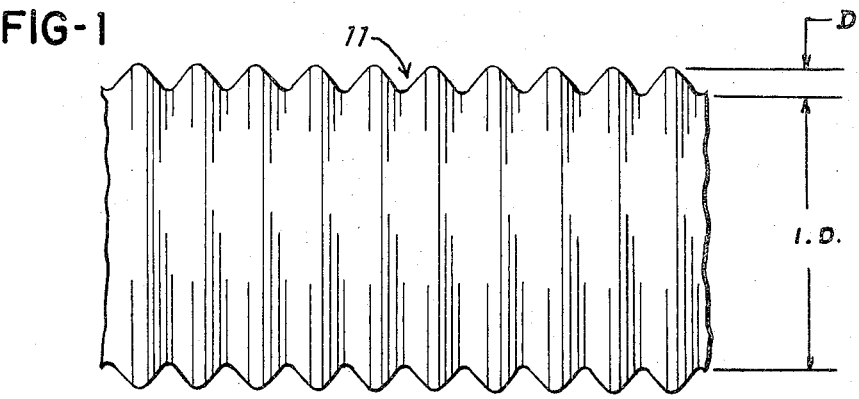
FIGURE 1 is an elevational view of a portion of the novel hose.
Figure 2:
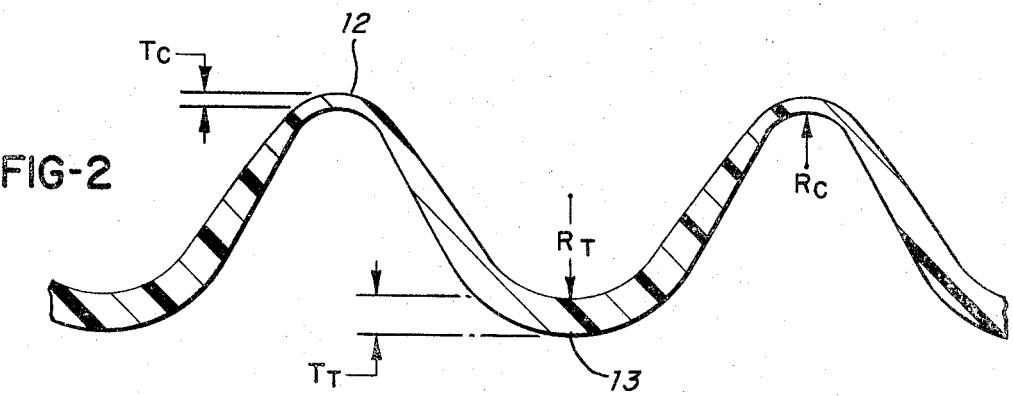
FIGURE 2 is an enlarged sectional view illustrating a portion of the wall of the hose.

Referring now to the drawings, a portion of a hose 11 is illustrated having a corrugated wall of nonuniform thickness. As shown in FIGURE 2 the crests 12 have a thickness $T_C$ in the order of .012 inch to .018 inch. The troughs 13 have a thickness $T_T$ which is in the order of .036 inch; the thickness of the wall, therefore, is approximately one-third to one-half as thick at the crests as the troughs.

As also shown by the drawings, the inner radius $R_C$ of the crests is approximately $3/64$ inch, while the inner radius $R_T$ at the troughs is approximately $3/32$ inch. Therefore, the inner radius of the troughs is approximately twice that of the crests.

The convolution has a depth (D) of about $7/32$ inch for a hose which has an internal diameter (I.D.) of 2 inches to 4½ inches. Therefore, the relationship between the depth and the internal diameter is slightly less than 11% for the 2 inch hose and slightly less than 5% for the 4½ inch hose. In any case, however, the convolutions have a depth less than 11% of the internal diameter of the hose.

The relationship of the wall thicknesses at the crests and troughs alone is sufficient to provide a high degree of flexibility with dimensional stability and resistance to external pressures, since the flexing takes place about the thin crest sections. While this factor alone may provide the necessary strength and flexibility, it is enhanced by the relationship of the depth of the corrugations and by the relative radii as described above.

The hose may be manufactured of many different plastic materials such as polyvinyl chloride, polyethylene, polypropylene, polyurethane, ABS resins, or may be copolymers such as polyethylene-ethylene-acrylate or polyvinyl acetate-polyethylene. The fabrication of the hose follows conventional blow molding techniques in which first a parison of extruded tubular plastic material is inserted into a mold having outer corrugated walls. The parison is subjected to sufficient heat to render it plastic when the mold is closed. Air is introduced into the mold under pressure which is sufficiently high to expand the plastic material against the mold; by extruding the parison to a diameter equal to the diameter of the inner corrugations, the outward pressure thins the material forced into the outer corrugations while maintaining the thickness at the inner corrugations. This creates the differential thickness shown in FIGURE 2. After the parison has been expanded into the final position, the mold is cooled, either by water or air, the mold is opened, and the finished product removed. The exact details of the molding will not be more fully described since they will generally follow techniques which have been developed and which are also described in the above-mentioned patent to Brinsmade et al.

We do not intend to be limited to the details specifically described above, but other modifications may be made within the spirit of the invention.

We claim:

A flexible hose composed of a single plastic member having a wall defining convolutions with alternate crests and troughs, said wall being approximately one-third to one-half as thick at said crests as at said troughs, said convolutions having a depth which is less than 11% of the internal diameter of said hose, and the internal radius of said troughs being approximately twice that of said crests.

References Cited by the Examiner

UNITED STATES PATENTS

| | | | |
|---|---|---|---|
| 1,523,951 | 1/1925 | Fulton | 138—121 |
| 2,817,363 | 12/1957 | Penrose | 138—122 |
| 2,898,941 | 8/1959 | Kilcup | 138—122 X |
| 3,201,111 | 8/1965 | Afton | 138—121 X |

LAVERNE D. GEIGER, *Primary Examiner.*

C. L. HOUCK, *Assistant Examiner.*